(12) United States Patent
Huang et al.

(10) Patent No.: US 11,894,921 B2
(45) Date of Patent: Feb. 6, 2024

(54) FACILITATING MCS USE WITH VARYING FEATURES FOR UCI TRANSMISSION

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/220,494

(22) Filed: Apr. 1, 2021

(65) Prior Publication Data

US 2021/0314082 A1 Oct. 7, 2021

Related U.S. Application Data

(60) Provisional application No. 63/004,579, filed on Apr. 3, 2020.

(51) Int. Cl.
*H04L 1/00* (2006.01)
*H04L 1/1867* (2023.01)
(Continued)

(52) U.S. Cl.
CPC .......... *H04L 1/0004* (2013.01); *H04L 1/1819* (2013.01); *H04L 1/1896* (2013.01); *H04W 72/21* (2023.01); *H04W 72/23* (2023.01)

(58) Field of Classification Search
CPC ... H04L 1/0004; H04L 1/1819; H04L 1/1896; H04L 1/007; H04W 72/0413; H04W 72/042
See application file for complete search history.

(56) References Cited

U.S. PATENT DOCUMENTS

| 2013/0064228 A1* | 3/2013 | Jang | ...................... | H04L 5/0057 370/335 |
| 2014/0177586 A1* | 6/2014 | Jang | ...................... | H04L 5/0053 370/329 |

(Continued)

FOREIGN PATENT DOCUMENTS

| CN | 105191174 A | 12/2015 |
| CN | 105703882 A | 6/2016 |

OTHER PUBLICATIONS

International Search Report and Written Opinion—PCT/US2021/025631—ISA/EPO—dated Jun. 23, 2021.

*Primary Examiner* — Christine Ng
(74) *Attorney, Agent, or Firm* — Arun Swain

(57) ABSTRACT

Techniques for signaling varied modulation and coding schemes for wireless communication are discussed. A method of wireless communication may comprise receiving, by a user equipment (UE), an indication to apply a modulation order cap to determine a first modulation and coding scheme for transmission of uplink control information different from a second modulation and coding scheme for transmission of data. The method may further comprise transmitting the uplink control information using the first modulation and coding scheme, wherein the first modulation and coding scheme is determined based, at least in part, on the received indication to apply the modulation order cap.

22 Claims, 9 Drawing Sheets

```
900
Receive an indication to apply a modulation order cap in determining a first modulation
and coding scheme for transmission of uplink control information, different from a
second modulation and coding scheme for transmission of payload data

↓

902
Transmit the uplink control information using a modulation and coding scheme indicated
by the received indication to apply the modulation order cap
```

(51) Int. Cl.
    *H04L 1/1812*     (2023.01)
    *H04W 72/21*     (2023.01)
    *H04W 72/23*     (2023.01)

(56) References Cited

U.S. PATENT DOCUMENTS

| | | |
|---|---|---|
| 2017/0207878 A1 | 7/2017 | Chen et al. |
| 2017/0325208 A1 | 11/2017 | Xin et al. |
| 2018/0167932 A1* | 6/2018 | Papasakellariou .... H04L 5/0094 |
| 2018/0220413 A1* | 8/2018 | Yang ..................... H04W 72/56 |
| 2019/0037586 A1* | 1/2019 | Park ......................... H04L 5/00 |
| 2019/0150179 A1* | 5/2019 | Soriaga ................. H04L 5/0046 |
| | | 370/329 |
| 2019/0166615 A1* | 5/2019 | Nimbalker ............. H04W 72/21 |
| 2019/0363843 A1* | 11/2019 | Gordaychik ............... H04L 1/08 |
| 2020/0196343 A1* | 6/2020 | Marinier ................ H04L 1/1896 |
| 2020/0229202 A1* | 7/2020 | Bagheri ............... H04L 25/0226 |
| 2020/0389848 A1* | 12/2020 | Ji ............................ H04L 1/203 |

\* cited by examiner

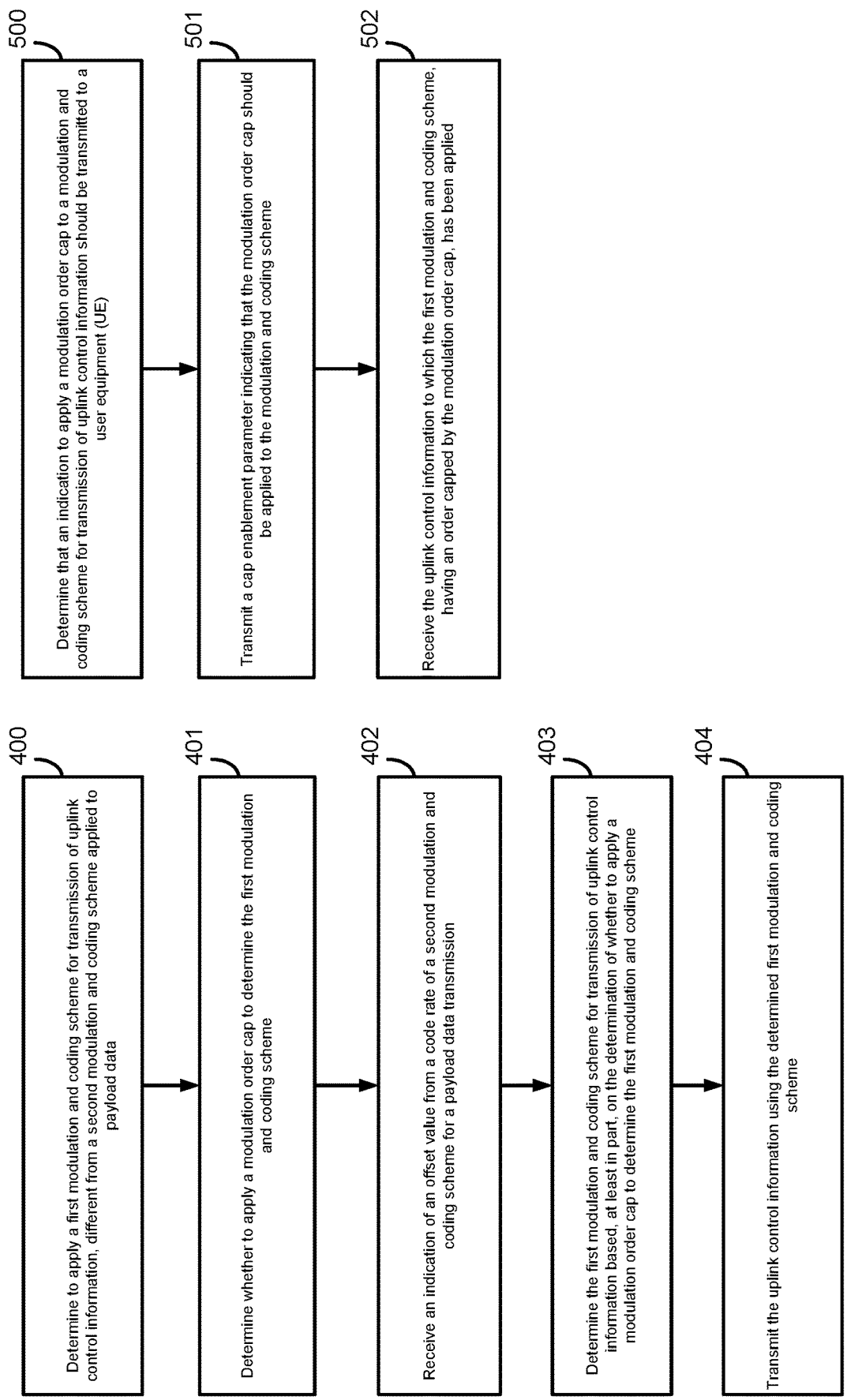

US 11,894,921 B2

FACILITATING MCS USE WITH VARYING FEATURES FOR UCI TRANSMISSION

CROSS-REFERENCE TO RELATED APPLICATIONS

This application claims the benefit of U.S. Provisional Patent Application No. 63/004,579, entitled, "SIGNALING ASPECTS FOR ALLOWING DIFFERENT MCS FOR UCI MULTIPLEXING ON PUSCH," filed on Apr. 3, 2020, which is expressly incorporated by reference herein in its entirety as if fully set forth below and for all applicable purposes. Aspects of techniques discussed below may be used in concert with one or more aspects discussed in U.S. patent application Publication Ser. No. 16/186,802, entitled "UPLINK CONTROL INFORMATION TRANSMISSION," which is also expressly incorporated herein by reference as if fully set forth below.

TECHNICAL FIELD

Aspects of the present disclosure relate generally to wireless communication systems, and more particularly, to techniques and apparatuses for allowing different multiplexing and coding schemes for multiplexed uplink control information. Certain embodiments of the technology discussed below can enable and provide enhanced efficiency, high communication speeds, low latency, and high reliability in transmission of uplink control information.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication may include determining, by a UE, whether to apply a first modulation and coding scheme for transmission of uplink control information multiplexed on a physical uplink shared channel (PUSCH), different from a second modulation and coding scheme applied to payload data. The method may include determining, by the UE, whether to apply a modulation order cap to determine the first modulation and coding scheme. The method may include determining, by the UE, the first modulation and coding scheme for transmission of uplink control information based, at least in part, on the determination of whether to apply a modulation order cap to determine the first modulation and coding scheme. The method may include transmitting the uplink control information on the PUSCH using the determined first modulation and coding scheme. In some aspects, the first modulation and coding scheme may be a modulation and coding scheme for transmission of at least one of: a hybrid automatic repeat request acknowledgement (HARQ-ACK) of the uplink control information, a first channel state information part of the uplink control information, or a second channel state information part of the uplink control information.

In some aspects, the method may include receiving, by the UE, an indication of an offset value from a code rate of the second modulation and coding scheme for the payload data transmission. The determination of the first modulation and coding scheme may be made further based on the received indication of the offset value. In some aspects, a code rate of the first modulation and coding scheme may be determined based on the received indication of the offset value. In some aspects, receiving an indication of an offset value from a code rate of the second modulation and coding scheme for the payload data transmission may comprise at least one of: receiving an indication of an offset value from the code rate of the second modulation and coding scheme for determining a code rate of a hybrid automatic repeat request acknowledgement (HARQ-ACK) of the uplink control information, receiving an indication of an offset value from the code rate of the second modulation and coding scheme for determining a code rate of a first channel state information part of the uplink control information, or receiving an indication of an offset value from the code rate of the second modulation and coding scheme for determining a code rate of a second channel state information part of the uplink control information.

In some aspects, determination of whether to apply a modulation order cap to determine the first modulation and coding scheme may include receiving, by the UE, a cap enablement parameter indicating enablement of the modulation order cap for the first modulation and coding scheme.

Determination of whether to apply a modulation order cap to determine the first modulation and coding scheme may include determining, by the UE, that the PUSCH is a low priority PUSCH. A determination, by the UE, of the first modulation and coding scheme for transmission of uplink control information may be based, at least in part, on the received cap enablement parameter and the determination that the PUSCH is a low priority PUSCH. The cap enablement parameter may be received via a radio resource control (RRC) configuration communication. The cap enablement parameter may comprise a downlink control information (DCI) format indication and a determination, by the UE of the first modulation and coding scheme for transmission of uplink control information may be based, at least in part, on the DCI format indication. In some aspects, the DCI format indication may comprise an indication of DCI format 1_2. For more examples and information relating to DCI formats used in wireless communications, see 3GPP Technical Specification (TS) 38.212 version 15.8.0 section 7.3.1, entitled "Multiplexing and channel coding" published Jan. 11, 2020, which is publicly available. In some aspects, the DCI format indication may comprise a priority indicator indicating a high priority, and the determination, by the UE, of the first modulation and coding scheme for transmission of uplink control information may be based, at least in part, on the priority indicator indicating high priority.

In an additional aspect, a method of wireless communication may include determining, by a base station to apply a modulation order cap by a user equipment (UE) to a modulation and coding scheme for transmission of uplink control information multiplexed on a physical uplink shared channel (PUSCH). The method may further include transmitting, by the base station, a cap enablement parameter indicating to apply the modulation order cap to the modulation and coding scheme. The method may further include receiving, by the base station, the uplink control information to which the first modulation and coding scheme, having an order capped by the modulation order cap, has been applied.

In some aspects, the uplink control information may comprise at least one of a hybrid automatic repeat request acknowledgement (HARQ-ACK) of the uplink control information, a first channel state information part of the uplink control information, or a second channel state information part of the uplink control information. In some aspects, transmitting the cap enablement parameter may comprise transmitting the cap parameter in a radio resource control (RRC) configuration communication. In some aspects, transmitting the cap enablement parameter may comprise transmitting the cap enablement parameter in downlink control information (DCI). The cap enablement parameter may comprise a DCI format indicator. The cap enablement parameter may comprise a high priority indicator in DCI format 1_2.

In some aspects, a method of wireless communication may include receiving, by a UE, an indication to apply a modulation order cap to determine a first modulation and coding scheme for transmission of uplink control information different from a second modulation and coding scheme for transmission of data and transmitting the uplink control information using the first modulation and coding scheme, wherein the first modulation and coding scheme is determined based, at least in part, on the received indication to apply the modulation order cap. In some aspects, the first modulation and coding scheme is further determined based on a received indication of an offset value from a code rate of the second modulation and coding scheme. In some aspects, a code rate of the first modulation and coding scheme is determined based on a received indication of an offset value from a code rate of the second modulation and coding scheme. In some aspects, the method may further include receiving, by the UE, an indication of an offset value from a code rate of the second modulation and coding scheme for transmission of data, wherein receiving, by the UE, the indication of the offset value comprises at least one of: receiving an indication of an offset value from the code rate of the second modulation and coding scheme for determining a code rate of a hybrid automatic repeat request acknowledgement (HARQ-ACK) of the uplink control information; receiving an indication of an offset value from the code rate of the second modulation and coding scheme for determining a code rate of a first channel state information part of the uplink control information; or receiving an indication of an offset value from the code rate of the second modulation and coding scheme for determining a code rate of a second channel state information part of the uplink control information. In some aspects the first modulation and coding scheme is a modulation and coding scheme for transmission of at least one of: a hybrid automatic repeat request acknowledgement (HARQ-ACK) of the uplink control information, a first channel state information part of the uplink control information, or a second channel state information part of the uplink control information. In some aspects, receiving, by the UE, an indication to apply a modulation order cap comprises receiving, by the UE, a cap enablement parameter indicating enablement of the modulation order cap for the first modulation and coding scheme, and wherein the first modulation and coding scheme is further determined based, at least in part, on a determination that the data has a first priority lower than a second priority of the uplink control information and the received cap enablement parameter. In some aspects, the cap enablement parameter comprises a downlink control information (DCI) format indication, and wherein the first modulation and coding scheme for transmission of uplink control information is further determined based, at least in part, on the DCI format indication. In some aspects, the DCI format indication comprises a priority indicator indicating the second priority, and wherein the first modulation and coding scheme for transmission of uplink control information is further determined based, at least in part, on the priority indicator indicating the second priority.

In an additional aspect of the present disclosure, a non-transitory computer-readable medium having program code recorded thereon is disclosed. The program code may include code to perform one or more actions or steps described herein.

In an additional aspect of the disclosure, an apparatus configured for wireless communication is disclosed. The apparatus includes at least one processor and a memory coupled to the processor. The processor is configured to perform the steps described herein. In an additional aspect of the disclosure, an apparatus for wireless communication may include means for performing the steps described herein.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a diagram illustrating an example process performed, for example, by a user equipment according to some embodiments of the present disclosure.

FIG. 5 is a diagram illustrating an example process performed, for example, by a base station according to some embodiments of the present disclosure.

DETAILED DESCRIPTION

Figure 1:
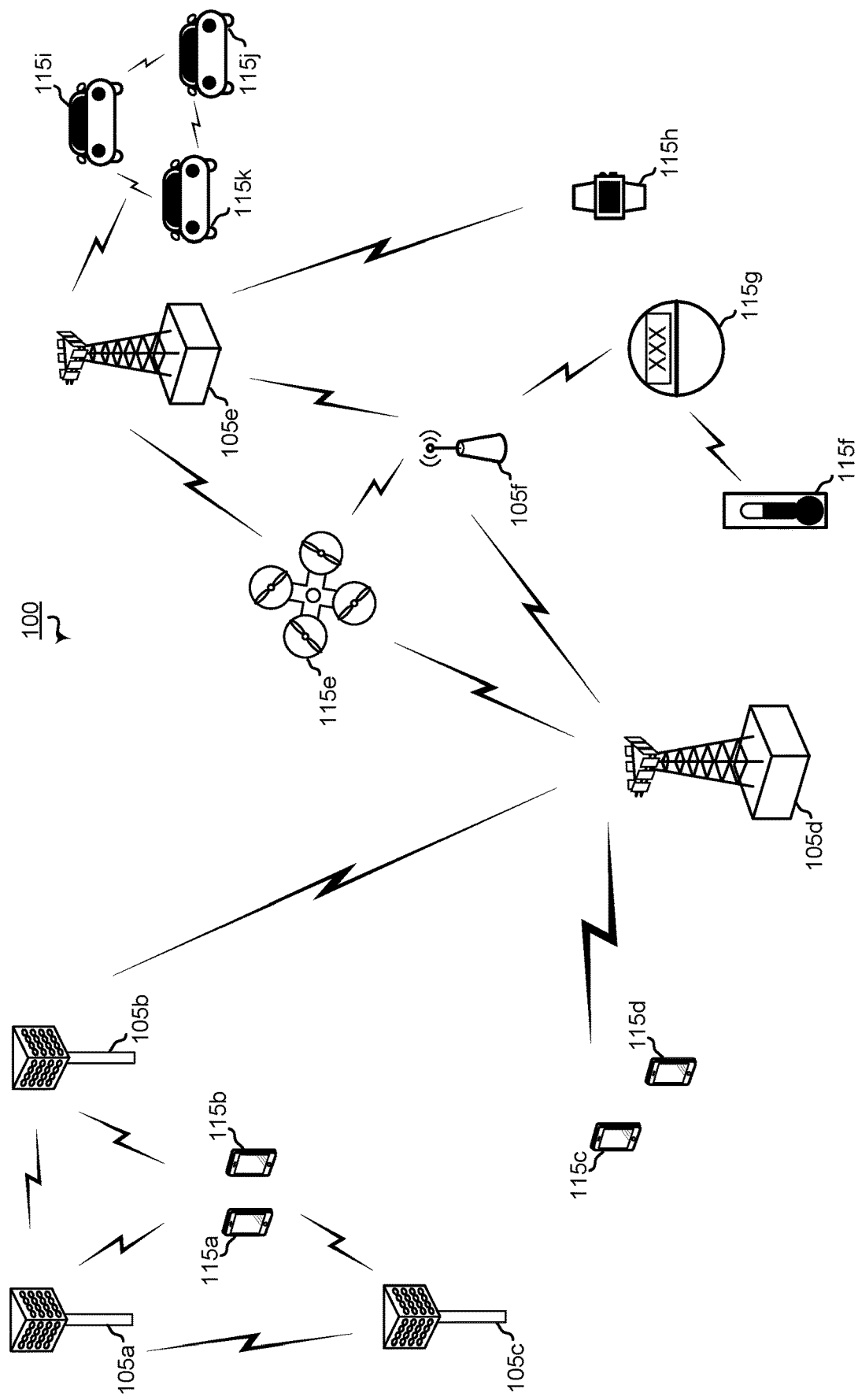
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
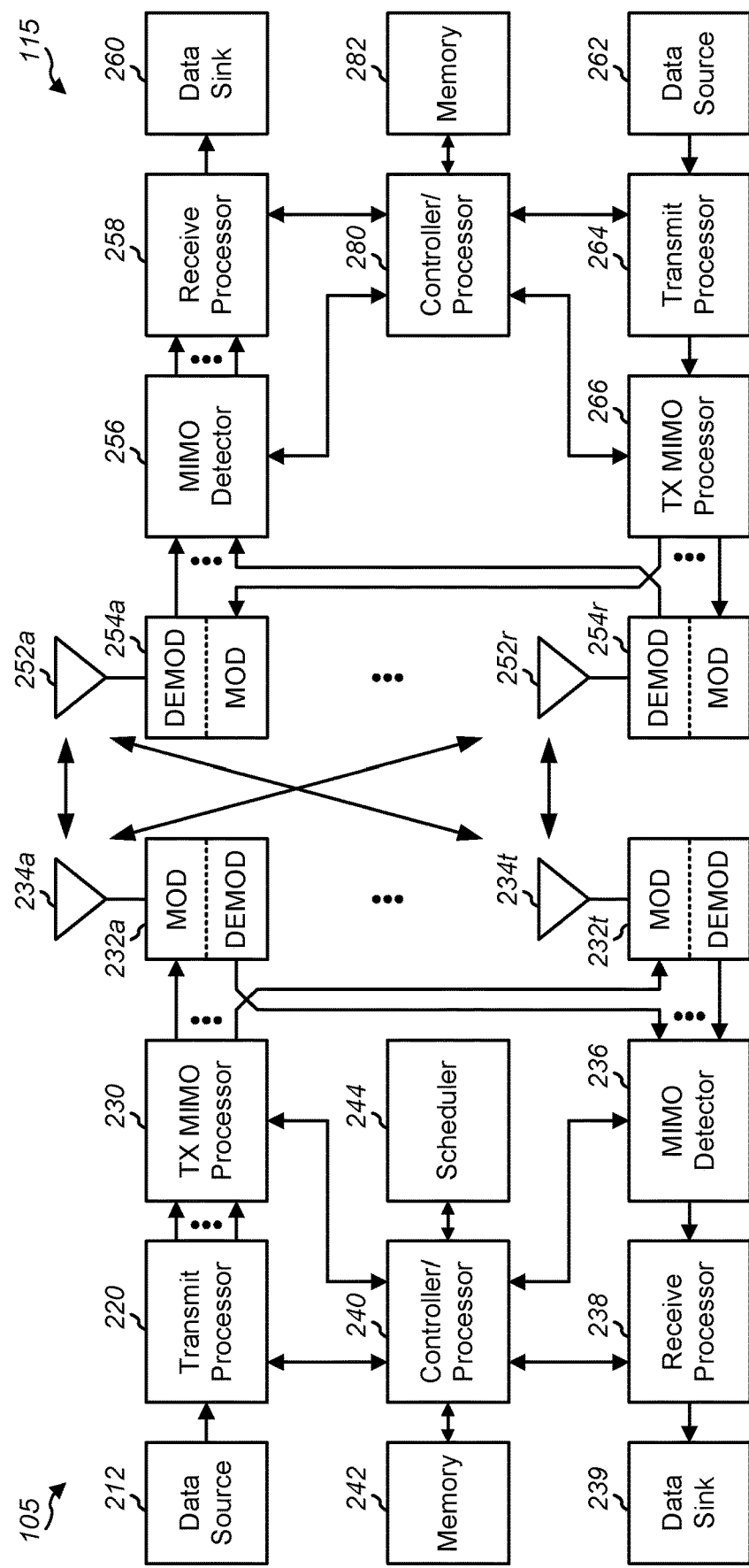
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280. A channel processor may determine reference signal received power (RSRP), received signal strength indicator (RSSI), reference signal received quality (RSRQ), channel quality indicator (CQI), and the like.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Received and processed control information may include reports comprising RSRP, RSSI, RSRQ, CQI, and the like. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3-5, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

A UE may transmit uplink control information and payload data to a base station. In some communications systems the UE may transmit the uplink control information on an uplink channel, such as a physical uplink shared channel (PUSCH). For example, the UE may multiplex both uplink control information and payload data on a PUSCH. The UE may transmit the uplink control information and the payload data using a common modulation order. The UE may back off a code rate for the uplink control information relative to the payload data to improve a reliability of the uplink control information relative to the payload data. For example, the uplink control information may be transmitted using a reduced code rate relative to the payload data resulting in a reduced likelihood of loss and/or error in a transmission of the uplink control information. However, using a modulation order associated with the payload data and a backed off code rate may result in relatively poor network performance and/or a relatively inefficient utilization of network resources. For example, if a code rate for the uplink control information is reduced, use of the same modulation order for both the uplink control information and the payload data may result in a mismatch between the modulation order and the code rate, such as a modulation order that is greater than needed. Such a mismatch may lead to inefficiencies in uplink control information transmission.

Figure 8:
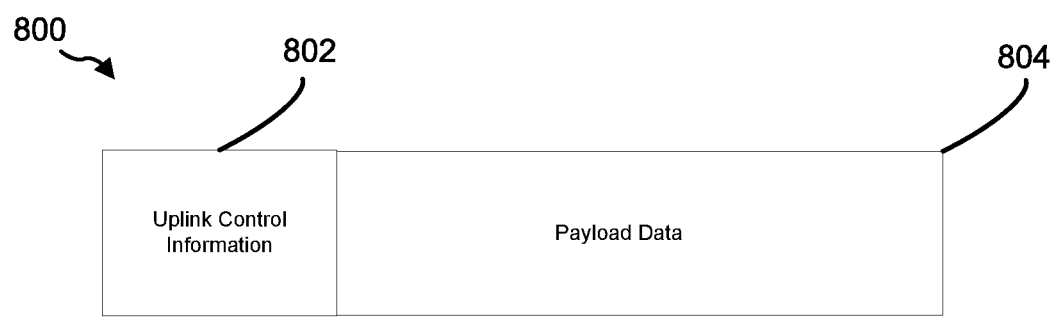
FIG. 8 is a diagram illustrating an example transmission including uplink control information and payload data according to some embodiments of the present disclosure.

Some aspects, described herein, may determine to apply a first modulation and coding scheme for uplink control information, different from a modulation and coding scheme for payload data. For example, a different modulation and coding scheme may be used for high priority uplink control information. In some instances, UCI can be multiplexed and transmitted on a low priority PUSCH (e.g., such as for some enhanced mobile broadband (eMBB) use cases). In particular, if uplink control information is multiplexed on a PUSCH with payload data, it may be advantageous to use a different modulation and coding scheme for the uplink control information than for the payload data. As one example, as shown in FIG. 8, a transmission 800 may include uplink control information 802 and payload data 804. The uplink control information 802 may be multiplexed with the payload data 804, and the transmission 800 may be a PUSCH transmission. A different modulation and coding scheme may be used in transmission of the uplink control information 802 than in the transmission of the payload data 804. For example, if the uplink control information 802 is high priority, such as indicated as being high priority by a priority indicator received from a base station, and the payload data 804, or transmission 800 in general, is not high priority a MCS used for transmission of the uplink control information 802 may be different from an MCS used for the payload data 804. In some embodiments, the uplink control information 802 may include multiple different parts and different MCSs may be used for different parts of the uplink control information 802. The use of different MCS schemes may be based on operating conditions or desired operational characteristics. Varied MCS schemes can be determined on a number of factors.

In some aspects, the determination of the first modulation and coding scheme may be based, at least in part, on a determination of whether to apply a modulation order cap in determining the first modulation and coding scheme. For example, a UE may determine a modulation order and/or a code rate of the first modulation and coding scheme for the uplink control information that is different from a modulation order and/or a code rate of a second modulation and coding scheme for the payload data. A UE may determine whether or not to implement a different modulation and coding scheme for uplink control information than a modulation and coding scheme used for payload data and whether or not to implement a modulation order cap in determining the modulation and coding scheme for uplink control information based on information received from a base station in a radio resource control (RRC) configuration communication or a downlink control information message, such as one or more cap enablement parameters. Furthermore, determinations of whether to apply different modulation and coding schemes and whether to apply modulation order caps in determining the different modulation and coding schemes may be made for individual parts of the uplink control information, such as for a HARQ-ACK, a first part of channel state information, and a second part of channel state information.

Figure 3:
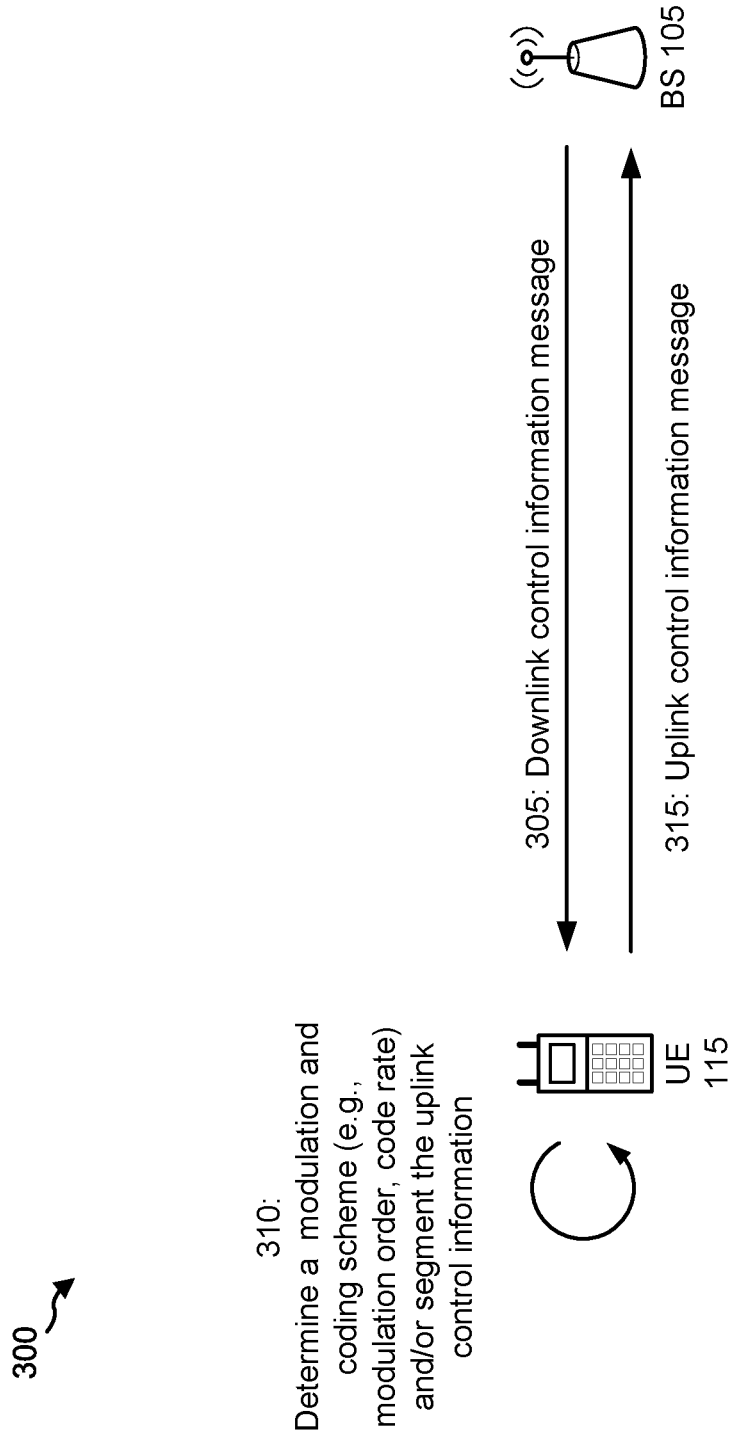
FIG. 3 is a diagram illustrating an example of uplink control information transmission according to some embodiments of the present disclosure.

FIG. 3 is a diagram 300 illustrating an example 300 of uplink control information transmission, according to some embodiments of the present disclosure. As shown in FIG. 3, the diagram 300 includes a UE 115 in communication with a base station 105.

As further shown in FIG. 3, the UE 115 may receive a downlink control information message 305 from base station 105. The downlink control information message 305 may, for example, be a downlink control information scheduling message for a physical downlink shared channel, such as a downlink control information scheduling message associated with a hybrid automatic repeat request acknowledgement (HARQ-ACK). The downlink control information message 305 may indicate, to the UE 115, whether to use a first modulation and coding scheme for transmission of uplink control information, such as high priority uplink control information, multiplexed on a PUSCH by the UE 115, that is different from a second modulation and coding scheme used for transmission of payload data on the PUSCH by the UE 115. Alternatively or additionally, the downlink control information message 305 may indicate, to the UE 115, whether to apply a modulation order cap in determining a modulation and coding scheme for use in transmission of uplink control information on the PUSCH by the UE 115.

A format of the downlink control information message 305 may indicate whether to apply a different modulation and coding scheme in transmitting uplink control information and/or whether to apply a modulation order cap in determining the modulation and coding scheme for the uplink control information. Use of a downlink control information (DCI) format 1_2, for example, by the base station 105 may indicate to the UE 115 to implement one or more varied MCSs. In some deployments, DCI format may indicate to implement either a different modulation and coding scheme for uplink control information, a modulation order cap for the modulation and coding scheme for the uplink control information, or both. In some embodiments, the downlink control information message 305, such as a downlink control information message including downlink control information in DCI format 1_2, may include a priority indicator. A high priority indicator, such as a priority indicator of 1, may indicate to the UE 115 to implement either a different modulation and coding scheme for uplink control information, a modulation order cap for the different modulation and coding scheme for the uplink control information, or both. A low priority indicator, such as a priority indicator of 0, may indicate to the UE 115 to avoid implementation of a different modulation coding scheme for uplink control information and/or a modulation order cap for the modulation and coding scheme for the uplink control information. For example, in some embodiments, a format of the DCI message 305 may be used by the UE 115 to determine whether to use a different modulation and coding scheme, and a priority indicator of the DCI message 305 may be used to determine whether to use a modulation order cap in determining the different modulation and coding scheme. In some embodiments, the UE may be configured by default, or by another parameter, to use a different modulation and coding scheme for the high priority uplink control information, and the format and/or priority indicator of the DCI message 305 may be used to determine whether to apply a modulation order cap. In some embodiments, separate priority indicators of the DCI message 305 may be included for indicating to use a different modulation and coding scheme and to implement a modulation order cap. High priority uplink control information may, for example, include uplink control information associated with a high priority indicator received from a base station instructing the UE to designate uplink control information as high priority. Low priority uplink control information may, for example, include uplink control information that is not associated with a high priority indicator received from a base station, or that is associated with a low priority indicator received from a base station.

In some embodiments, in place of or in addition to downlink control information message 305, the UE 115 may receive from the base station 105 an RRC communication. For example, for semi-statically configured uplink control information, such as P-CSI, a radio resource control (RRC) communication may be transmitted from the base station 105 to the UE 115. The RRC communication may indicate, to the UE, whether to implement either a different modulation and coding scheme for uplink control information from a modulation and coding scheme for payload data, a modulation order cap for the first modulation and coding scheme for the uplink control information, or both. For example, the RRC communication may include a cap enablement parameter, a modulation and coding scheme adjustment parameter, or both. As one example, a high cap enablement parameter in the RRC communication may indicate to the UE 115 to apply a modulation order cap in determining a modulation and coding scheme for uplink control information. A high modulation and coding scheme differentiation parameter may indicate to the UE 115 to apply a modulation order for the first modulation and coding scheme for the transmission of the uplink control information that is different from a modulation order applied to payload data. In some embodiments, the UE 115 may be configured by default, or by another communication, to use a different modulation and coding scheme for the uplink control information and may determine whether to apply a modulation order cap in determining the different modulation and coding scheme based on a parameter in the received RRC communication.

The UE 115 may determine a modulation and coding scheme for the uplink control information using the received downlink control information message 305, or based on a received RRC communication, at process 310. For example, the UE 115 may determine whether to apply a first modulation and coding scheme to uplink control information different from a modulation and coding scheme applied to payload data and whether to apply a modulation order cap in determining the first modulation and coding scheme. Determination of a modulation and coding scheme may include determination of a modulation order of the modulation and coding scheme and determination of a code rate of the modulation and coding scheme. Determination of the modulation order may include determination of whether to apply a modulation order cap in determining the modulation order. If a determination is made, by the UE 115, to apply a modulation order cap in determination of the modulation order, the UE 115 may determine a modulation order of the modulation and coding scheme for application to the uplink control information that is less than or equal to a modulation order specified by the modulation order cap. The UE 115 may determine downlink control information scheduling of the physical downlink shared channel associated with a hybrid automatic repeat request acknowledgement (HARQ-ACK). In some embodiments, the UE 115 may also segment uplink control information.

A determination by the UE 115 of whether to apply a different modulation and coding scheme to high priority uplink control information from a modulation and coding scheme applied to payload information and/or whether to implement a modulation order cap in determining a modulation order of the modulation and coding scheme for the uplink control information may be based on one or more aspects of the received downlink control information message 305. For example, such a determination may be made based on a format of the downlink control information message 305, one or more priority indicators of the received downlink control information message 305, or both. In some embodiments, when the downlink control information message 305 is received, the UE 115 may determine a format of the downlink control information message 305. If the downlink control information message has a predetermined format, such as DCI format 1_2, the UE 115 may determine to apply a different modulation and coding scheme to the uplink control information from a modulation and coding scheme applied to payload data, may determine to apply a modulation order cap in determining a modulation and coding scheme to apply to the uplink control information, or both. In some embodiments, the UE 115 may further determine whether to apply a different modulation and coding scheme, such as a different modulation order, to the uplink control information from a modulation and coding scheme applied to payload data and/or whether to apply a modulation order cap in determining the modulation and coding scheme to apply to the uplink control information based on a status of one or more priority indicators included in the downlink control information message 305, such as a downlink control information message with DCI format 1_2. For example, the downlink control information message 305 may include a priority indicator. If the priority indicator is high, the UE 115 may determine to apply a different modulation and coding scheme to the uplink control information from a modulation and coding scheme applied to payload data and to apply a modulation cap in determining the modulation order of the modulation and coding scheme for the uplink control information. In some embodiments, separate priority indicators, or other variables, may be included in the downlink control information message 305 to indicate whether to apply a different modulation and coding scheme to the uplink control information from a modulation and coding scheme applied to payload data and whether to apply a modulation order cap in determining the modulation order of the modulation and coding scheme for the uplink control information. Thus, in one possible configuration, a different modulation order may be applied to the uplink control information from a modulation order applied to payload data, based on a first indicator, but a modulation order cap may not be applied, based on a second indicator. If the UE 115 determines that a format other than DCI format 1_2 is used for the downlink control information message 305 and/or that a priority indicator indicates low status, such as low priority, the UE 115 may determine to apply the same modulation and coding scheme to the uplink control information and the payload data and/or to refrain from application of a modulation order cap in determining the modulation and coding scheme for the uplink control information.

In some embodiments, the UE 115 may determine a modulation and coding scheme to apply to uplink control information based on a received RRC communication. For example, information from an RRC configuration communication may be used when determining a modulation and coding scheme for primary channel state uplink control information. The UE 115 may determine whether to apply a different modulation and coding scheme to uplink control information from a modulation and coding scheme applied to payload data and/or whether to apply a modulation order cap in determining the modulation order of the modulation and coding scheme for the uplink control information based on one or more RRC configuration enable/disable parameters received in an RRC communication. For example, the UE 115 may determine in process 310 based on a high status of a single parameter received in an RRC communication, to apply a different modulation and coding scheme for the uplink control information and to use the modulation order cap in determining the modulation order of the modulation and coding scheme for the uplink control information. In some embodiments, a first parameter may be included in the RRC configuration communication for indicating whether to use a different modulation and coding scheme for the uplink control information, and a second parameter may be included in the RRC configuration communication for indicating to apply a modulation cap in determining the modulation order of the modulation and coding scheme for the uplink control information. In some embodiments, the UE 115 may be configured by default, or by another parameter, to apply a different modulation and coding scheme to the uplink control information and may determine based on a cap activation parameter received in the RRC communication whether to apply a modulation order cap in determining the modulation and coding scheme for the uplink control information.

In some embodiments, the UE 115 may further base the determination of a whether to apply a different modulation and coding scheme to uplink control information and/or whether to apply a modulation order cap in determining the different modulation and coding scheme on a priority of a physical uplink shared channel (PUSCH) on which the uplink control information is to be transmitted. For example, if the uplink control information is multiplexed on a low priority PUSCH, the UE 115 may determine, based on the low priority of the PUSCH, to use a different modulation and coding scheme for the uplink control information from a modulation and coding scheme used for payload data and/or to apply a modulation order cap in determining the modulation order of the modulation and coding scheme for the uplink control information. If the uplink control information is multiplexed on a high priority PUSCH, the UE 115 may determine, based on the high priority of the PUSCH, to use the same modulation order and modulation and coding scheme for the uplink control information and the payload data and/or to refrain from application of a modulation order cap in determining a modulation and coding scheme. The priority of the PUSCH may, for example, be determined based on a priority indicator included in downlink control information scheduling the PUSCH. For example, if the DCI scheduling the PUSCH indicates that the PUSCH on which the uplink control information will be multiplexed is low priority, or the priority indicator is not present in the DCI scheduling the PUSCH, the UE may determine that the PUSCH is low priority. If an indicator that the priority of the PUSCH is high is included in the DCI scheduling the PUSCH, the UE may determine that the PUSCH is high priority. Thus, in some embodiments, a determination of whether to use a different modulation and coding scheme for uplink control information from a modulation and coding scheme for payload data and whether to apply a modulation order cap in determining the modulation order of the modulation and coding scheme for the uplink control information may be based on a format of received downlink control information, one or more parameters, such as priority parameters, included in the downlink control information, and a priority of the PUSCH on which the uplink control information will be transmitted. Alternatively or additionally, a determination of whether to use a different modulation and coding scheme for uplink control information from a modulation and coding scheme for payload data and whether to apply a modulation order cap in determining the modulation order of the modulation and coding scheme for the uplink control information may be based on one or more parameters received in an RRC configuration communication and a priority of the PUSCH on which the uplink control information will be transmitted.

In some embodiments, the UE 115 may receive, from the base station 105, one or more beta_offset values for determining a code rate of the modulation and coding scheme for the uplink control information. Beta_offset values may be used to determine a scaled-down coding rate for a modulation and coding scheme for transmission of high priority uplink control information. Scaling-down of the coding rate may enhance reliability of transmission of uplink control information. For example, a beta_offset value may be specified for determination of a code rate such that a code rate for the uplink control information is equal to the code rate for the payload data of the PUSCH divided by the beta_offset value. In some embodiments, separate beta offsets may be received for different parts of uplink control information. For example, separate betta offsets may be received for a HARQ-ACK, such as a high priority HARQ-ACK, a first part of channel state information, such as CSI-part1, and a second part of channel state information, such as CSI-part2. In some embodiments, information received from the base station 105 in the downlink control information message 305 may indicate to apply a different modulation and coding scheme only to part of the uplink control information, such as applied to one or more of a HARQ-ACK, a first part of channel state information, and a second part of channel state information. Furthermore, in some embodiments, information received from the base station 105 in the downlink control information message 305 may indicate to apply a modulation order cap only in determining a modulation order of a modulation and coding scheme for part of the channel state information. The base station 105 may indicate to the UE 115 to apply the modulation order cap in determining a modulation order for a modulation and coding scheme of at least one of a HARQ-ACK, a first part of channel state information, and a second part of channel state information. In some embodiments, separate indications of whether to apply a modulation order cap for each of the HARQ-ACK, a first part of channel state information, and a second part of channel state information, may be transmitted in the downlink control information message 305, such as separate priority indicators or other parameters, or in an RRC configuration communication, such as separate RRC configuration enable/disable parameters. For example, when high priority uplink control information is multiplexed on a PUSCH without uplink shared channel payload data, the UE 115 may determine to apply the modulation order cap only in determining a modulation and coding scheme for a HARQ-ACK of uplink control information and not channel state information transmitted on the PUSCH.

Based on the determination of whether to use a different modulation and coding scheme for the uplink control information and whether to apply a modulation order cap, the UE 115 may determine a modulation and coding scheme to apply to uplink control information. A determination of the modulation and coding scheme may, for example, include a determination of a modulation order and a code rate of the modulation and coding scheme. For example, UE 115 may determine spectral efficiency for the uplink control information transmission based at least in part on the spectral efficiency for the PUSCH and the beta offset value. In this case, UE 115 may determine a largest index of a modulation and coding scheme in a modulation and coding scheme table, such that a product of a code rate and a quadrature amplitude modulation (QAM) order of the determined modulation and coding scheme is less than a spectral efficiency for uplink control information determined and described above. For example, UE 115 may determine a code rate and QAM order that are associated with an index value in the modulation and coding scheme table less than the spectral efficiency for the uplink control information transmission. In this case, UE 115 may select the QAM order for modulation of the uplink control information transmission and the code rate for a polar code rate for the uplink control information transmission. In determining the order of the modulation and coding scheme, such as the QAM order, the UE 115 may apply a modulation order cap, if the UE 115 has determined to apply the modulation order cap. For example, the UE 115 may determine an order of the modulation and coding scheme, such as a QAM order, that is no greater than an order specified by the modulation order cap. In some aspects, UE 115 may rate match based at least in part on the beta offset value. For example, the UE 115 may determine a modulation order of the modulation and coding scheme based, at least in part, on a modulation order cap. The UE 115 may then apply the determined modulation and coding scheme to the uplink control information and may generate an uplink control information message 315. The UE 115 may then transmit the uplink control information message 315 to the base station 105. The uplink control information included in the message 315 may, for example, be dynamic scheduled uplink control information, such as HARQ-ACK information or semi-statically configured uplink control information, such as P-CSI information.

In some embodiments, UE 115 may determine a code rate of the modulation and coding scheme for the uplink control information based at least in part on the order of the modulation and coding scheme, such as the QAM order. For example, UE 115 may select the QAM order from the modulation and coding scheme table and may determine a code rate that is a quotient of the spectral efficiency for the uplink control information transmission and a value for the QAM order. In some embodiments, UE 115 may determine the code rate based at least in part on a scaling factor. For example, UE 115 may scale a code rate for the uplink control information relative to a code rate for the PUSCH based at least in part on a scaling of a QAM order for the uplink control information relative to a QAM order for the PUSCH and the beta offset value. Additionally, or alternatively, UE 115 may scale a resource element allocation for the uplink control information relative to a resource allocation for the PUSCH based at least in part on the scaling of the QAM order for the uplink control information relative to the QAM order for the PUSCH and the beta offset value.

In some embodiments, UE 115 may determine a resource allocation relating to the modulation and coding scheme for the uplink control information transmission. For example, UE 115 may determine a quantity of resource elements for the uplink control information transmission based at least in part on a quantity of bits of uplink control information that are to be transmitted and the spectral efficiency of the uplink control information. In this case, the quantity of resource elements, RE, may equal a quotient of a quantity of bits of the uplink control information and a spectral efficiency for uplink control information determined and described above (e.g., based on a QAM order, based on a code rate, etc.) or an actual spectral efficiency achievable for the uplink control information (based on the QAM order, based on the code rate, etc.). In other words, UE 115 may determine a result of #REs=nBits_UCI/SE_UCI*, where #REs is a quantity of resource elements for which resources are to be allocated, nBits_UCI represents a quantity of bits of uplink control information, and SE_UCI* represents an actual spectral efficiency of uplink control information determined based at least in part on a calculated maximum spectral efficiency, a code rate, and a QAM order, as described above.

In some embodiments, UE 115 may include one or more additional resource elements based at least in part on the quantity of bits of the uplink control information and the spectral efficiency. For example, UE 115 may determine that a first quantity of whole resource elements and a partial resource element are to be used to transmit the uplink control information, and may determine to allocate a complete resource element for the uplink control information transmission rather than a partial resource element. In some embodiments, UE 115 may determine a resource allocation for the PUSCH. For example, UE 115 may determine a quantity of remaining resource elements after allocating one or more resource elements for the uplink control information transmission, and may allocate the remaining resource elements for the PUSCH.

A UE may determine to apply a different modulation and coding scheme to uplink control information from a modulation and coding scheme applied to payload data. The UE may also determine whether to cap a modulation order of the modulation and coding scheme for the uplink control information. Use of a different modulation and coding scheme and capping of a modulation order of the modulation and coding scheme may be useful in the context of multiplexing of high priority uplink control information with payload data on a PUSCH. An example method for determining, by a UE, a modulation and coding scheme for uplink control information is shown in FIG. 4. The method may begin, at step 400, with determination to apply a first modulation and coding scheme for transmission of uplink control information, different from a second modulation and coding scheme applied to payload data. The uplink control information may be uplink control information to be multiplexed on a PUSCH, such as with payload data of the PUSCH. For example, the UE may receive a communication from the base station specifying to use a different modulation and coding scheme for uplink control information. The first modulation and coding scheme may, for example, have a different modulation order and/or coding rate from the second modulation and coding scheme. In some cases, a determination may be made to apply a different modulation and coding scheme to only a part of uplink control information, such as to a HARQ-ACK, but not first and second parts of channel state information, or to a HARQ-ACK and a first part of channel state information but not a second part of channel state information. If uplink control information being multiplexed on a PUSCH is low priority, the UE may determine to apply the same modulation and coding scheme to both the uplink control information and the payload data.

In some embodiments, such as embodiments involving transmission of semi-statically configured uplink control information such as P-CSI, information specifying whether to use a different modulation and coding scheme may be received, by the UE, in a radio resource control (RRC) communication, such as in one or more RRC configuration enable/disable parameters. For example, an RRC configuration enable/disable parameter may, when high, indicate to use a different modulation and coding scheme for the uplink control information. If the RRC configuration enable/disable parameter is low, a determination may be made, by the UE, to use the same modulation and coding scheme for the uplink control information and the payload data. In some embodiments, a determination may be made to use a different modulation and coding scheme and to apply a modulation order cap in determining the different modulation and coding scheme based on a single parameter indicating to use a modulation order cap.

In some embodiments, such as embodiments involving transmission of dynamic scheduled uplink control information such as HARQ-ACK, information specifying whether to use a different modulation and coding scheme may be received, by the UE, in downlink control information, such as downlink control information scheduling the PDSCH associated with the HARQ-ACK. For example, the determination of whether to use a different modulation and coding scheme may be based on a format of received downlink control information. If the downlink control information has a DCI format of 1_2, the UE may determine to use a different modulation and coding scheme. If the downlink control information has another DCI format, such as DCI format 1_1, the UE may determine to use the same modulation and coding scheme for both uplink control information and payload data. In some embodiments, a DCI communication from a base station, such as a DCI message in DCI format 1_2, may further include one or more priority indicators. A priority indicator may be further used, in addition to or in place of a format of the DCI message, in a determination of whether to use a different modulation and coding scheme. For example, even if a DCI message is received in format 1_2, if a priority indicator of the DCI message is low, the UE may determine to use the same modulation and coding scheme for the uplink control information and the payload data. If a DCI message is received in format 1_2, and a priority indicator of the DCI message is high, the UE may determine to use a different modulation and coding scheme.

In some embodiments, step 400's determination of whether to use a different modulation and coding scheme may be made further based on one or more characteristics of a PUSCH on which the uplink control information is multiplexed. In some embodiments, if the uplink control information is multiplexed on a high priority PUSCH, the UE may apply the same modulation and coding scheme irrespective of received downlink control information and/or RRC information. In some embodiments, if the uplink control information is multiplexed on a low priority PUSCH, the UE may determine whether to use a different modulation and coding scheme for the uplink control information based on receive downlink control information and/or received RRC communications.

When a UE determines to use a different modulation and coding scheme for uplink control information than for payload data, the UE may also, at step 401 determine whether to apply a modulation order cap in determining the different modulation and coding scheme for the uplink control information. For example, in some cases code rate adjustments may render a lower modulation order for the different modulation and coding scheme more suitable. In such cases, applying a modulation order cap to limit a modulation order of the modulation and coding scheme for the uplink control information may enhance system efficiency and performance by limiting a modulation order of the uplink control information. The UE may determine whether to apply a modulation order cap in determining the first modulation and coding scheme for the uplink control information in a similar manner to the determination to use a different modulation and coding scheme for the uplink control information. For example, the UE may determine whether to apply a modulation order cap based on information received from a base station in an RRC communication or in a downlink control information message. The RRC communication and/or downlink control information message may include a cap enablement parameter. In some cases, a determination may be made to apply a modulation order cap in determination of a modulation and coding scheme of a part of uplink control information, such as to a HARQ-ACK, but not first and second parts of channel state information, or to a HARQ-ACK and a first part of channel state information but not a second part of channel state information.

In some embodiments, such as embodiments involving transmission of semi-statically configured uplink control information such as P-CSI, information, such as a cap enablement parameter, specifying whether to use a modulation order cap in determining the modulation and coding scheme for the uplink control information may be received, by the UE, in a radio resource control (RRC) communication. Cap enablement parameter may, for example, include one or more RRC configuration enable/disable parameters. For example, an RRC configuration enable/disable parameter may, when high, indicate to use a modulation order cap in determining the different modulation and coding scheme for the uplink control information. If the RRC configuration enable/disable parameter is low, a determination may be made not to apply a modulation order cap. In some embodiments, a determination may be made to use a different modulation and coding scheme based on a single parameter indicating to apply a modulation order cap. For example, a modulation order cap may always be implemented when a different modulation and coding scheme is used for the uplink control information. Alternatively, a UE may be configured to always use a different modulation and coding scheme when high priority uplink control information is multiplexed on a low priority PUSCH and thus a single parameter may be received indicating whether or not to apply a modulation order cap in determining the modulation and coding scheme for the uplink control information. In some embodiments, separate RRC configuration parameters may be received by the UE, with a first RRC configuration parameter indicating, to the UE, whether to apply a different modulation and coding scheme to uplink control information and a second RRC configuration parameter indicating, to the UE, whether to apply a modulation order cap in determining the different modulation and coding scheme. Such functionality would, for example, enable the UE to apply a different modulation and coding scheme to uplink control information without implementing a modulation order cap. In some embodiments, the UE may receive, in the RRC communication, information specifying a specific modulation order cap to be implemented.

In some embodiments, such as embodiments involving transmission of dynamic scheduled uplink control information such as HARQ-ACK, information specifying whether to use a modulation order cap may be received, by the UE, in downlink control information, such as downlink control information scheduling the PDSCH associated with the HARQ-ACK. For example, the determination of whether to apply a modulation order cap may be based on a cap enablement parameter received in the downlink control information. The cap enablement parameter may, for example include a format of received downlink control information and/or one or more priority indicators included in the downlink control information. If the downlink control information has a DCI format of 1_2, the UE may determine to apply a modulation order cap. For example, the use of DCI format 1_2 may indicate to the UE to both use a different modulation and coding scheme for uplink control information and to apply a modulation order cap in determining the different modulation and coding scheme. Alternatively, the UE may be configured to apply a different modulation and coding scheme by default, if the uplink control information is multiplexed on a low priority PUSCH and may determine whether to apply a modulation order cap in determining the different modulation and coding scheme based on the format of the downlink control information. If the downlink control information has another DCI format, such as DCI format 1_1, the UE may determine to refrain from use of the modulation order cap. In some embodiments, a DCI communication from a base station, such as a DCI message in DCI format 1_2, may further include one or more priority indicators. A priority indicator may be further used, in addition to or in place of a format of the DCI message, in a determination of whether to use a modulation order cap. For example, even if a DCI message is received in format 1_2, if a priority indicator of the DCI message is low, the UE may determine to refrain from application of the modulation order cap. For example, in some embodiments, the DCI message format may be used to determine whether to use a different modulation and coding scheme for the uplink control information, and a DCI format indicator may be used, by the UE, to determine whether to apply a modulation order cap in determining the different modulation and coding scheme. For example, if a DCI message is received in format 1_2, and a priority indicator of the DCI message is high, the UE may determine to use a different modulation and coding scheme and to apply a modulation order cap in determining the modulation order of the different modulation and coding scheme. Such functionality would enable the UE to determine, in some cases, to use a different modulation and coding scheme for the uplink control information while foregoing application of a modulation order cap in determination of the different modulation and coding scheme. In some embodiments, the UE may receive, in the downlink control information, information specifying a specific modulation order cap to be implemented.

In some embodiments, step 401's determination of whether to apply a modulation order cap may be made further based on one or more characteristics of a PUSCH on which the uplink control information is multiplexed. In some embodiments, if the uplink control information is multiplexed on a high priority PUSCH, the UE may apply the same modulation and coding scheme irrespective of received downlink control information and/or RRC information, and thus may forego application of the modulation order cap. In some embodiments, if the uplink control information is multiplexed on a low priority PUSCH, the UE may determine whether to use a different modulation and coding scheme for the uplink control information, and whether to apply a modulation order cap, based on receive downlink control information and/or received RRC communications.

In some embodiments, the UE may, at step 402, receive an indication of an offset value from a code rate of a second modulation and coding scheme for a payload data transmission. For example, a base station may transmit, to the UE, an indication of an offset value from a code rate of a modulation and coding scheme for the payload data transmission for use in determining a code rate of the different coding and modulation schemes for uplink control information. For example, received offset values may be beta_offset values that, when used to divide a code rate of the modulation and coding scheme for the payload data of the PUSCH, may produce code rates for modulation and coding schemes for uplink control information. Beta_offset values may be transmitted in RRC configuration information, in downlink control information, or via another communication transmission. In some embodiments, multiple beta_offset values may be received by the UE for use in determining multiple modulation and coding schemes for multiple parts of uplink control information. For example, separate beta_offset values may be received for HARQ_ACK, for a first part of channel state information, and for a second part of channel state information. The separate beta_offset values may be used to determine coding rates for modulation and coding schemes for each of the HARQ_ACK, the first part of the channel state information, and the second part of the channel state information.

The UE may, at step 403, determine, based, at least in part, on the determination of whether to apply a modulation order cap, the modulation and coding scheme for the uplink control information. If the UE determines to refrain from use of a different modulation and coding scheme for the uplink control information, the UE may use the same modulation and coding scheme for the uplink control information and the payload data multiplexed on the PUSCH. However, if the UE determines to use a different modulation and coding scheme, the UE may determine a modulation order and/or code rate of the different modulation and coding scheme for the uplink control information. In some embodiments, different modulation and coding schemes, having different modulation orders and/or different code rates, may be determined for different portions of uplink control information. For example, separate modulation and coding schemes may be determined for a HARQ-ACK, a first part of channel state information, and a second part of channel state information. In some embodiments, a modulation order cap may be applied in determining the modulation and coding scheme for some parts of the uplink control information, such as a HARQ-ACK and a first part of channel state information, but not for other parts of the uplink control information, such as the second part of the channel state information, based on separate modulation order cap activation parameters for each of the parts of the uplink control information received from the base station. In some embodiments different code rates may be determined for separate modulation and coding schemes for each of the HARQ-ACK, a first part of channel state information, and a second part of channel state information.

Determination of the modulation and coding scheme, at step 403, may include determination of a modulation order of the modulation and coding scheme using the modulation order cap. For example, if, at step 401, the UE determined to apply the modulation order cap, the UE may apply the modulation order cap in determining the modulation order of the modulation and coding scheme for the uplink control information. In some embodiments, the UE may include an internal modulation order cap, such as a modulation order cap set at quadrature phase shift keying (QPSK), and the cap may be activated and deactivated based on information received from a base station. In determining the modulation order of the modulation and coding scheme for the uplink control information, the UE may select a modulation order that is less than or equal to QPSK. For example, if the cap is activated, the UE may lower a modulation order for the modulation and coding scheme of the uplink control information from a predetermined level of 256QAM to QPSK. If the cap is not activated, the UE may proceed to apply the modulation order of 256QAM. The use of the modulation order cap in determining the modulation order may be particularly advantageous, for example, in cases where a code rate of the modulation and coding scheme is low. For example, if a code rate of the modulation and coding scheme for the uplink control information is low, such as 1/8, as specified by a beta_offset value, a lower modulation order, such as QPSK, may be more appropriate than a modulation order of 256QAM. In some embodiments, the modulation order cap may be set at a constant value, and may be toggled on and off based on one or more conditions, such as receipt, from a base station, of an indication that a modulation order cap should be applied or a code rate of a modulation and coding scheme determined by the IE or the base station being low. A modulation order cap may, for example, be a parameter specifying a maximum modulation order of a modulation and coding schemes that will be considered for selection. For example, a UE may have access to multiple modulation and coding schemes having multiple different modulation and coding schemes. If a modulation order cap is activated, a UE may consider only modulation and coding schemes having a modulation order equal to or less than the maximum modulation order specified by the modulation order cap in determining a modulation and coding scheme to be applied to uplink control information. As one example, a modulation order cap may be set at a maximum modulation order of QPSK, and thus an upper limit of QPSK may be imposed on a modulation order of modulation and coding schemes for transmission of uplink control information when the modulation order cap is enabled. In some embodiments, the cap may vary based on communications received from a base station. For example, a cap enablement parameter received from a base station may specify a maximum modulation order for use in a modulation and coding scheme when the cap is enabled. Thus, for example, a modulation order cap may, in some embodiments, be applied when a code rate of the modulation and coding scheme for the uplink control information is low. In some embodiments, a modulation order cap in the UE may be set, in addition to being activated and deactivated, based on information received from a base station.

Determination of the modulation and coding scheme for the uplink control information, at step 403, may also include determination of a code rate of the modulation and coding scheme for the uplink control information. In some embodiments, the UE may determine a code rate of the modulation and coding scheme for the uplink control information based on one or more offset values, such as beta_offset values, received by the UE. For example, the UE may determine a code rate for the first modulation and coding scheme for the uplink control information by dividing a code rate of a second modulation and coding scheme for the payload data multiplexed on the PUSCH by the received beta_offset value.

The UE may, at step 404, transmit the uplink control information using the determined first modulation and coding scheme. For example, the UE may transmit the uplink control information using the determined code rate and the determined modulation order. Thus, the UE may determine a modulation and coding scheme applied to uplink control information based, at least in part, on a determination of whether to apply a modulation order cap.

A base station may indicate to a UE whether to apply a modulation order cap. An example method, shown in FIG. 5, of base station operation may begin, at step 500, with determining to indicate to a UE to apply a modulation order cap to a modulation and coding scheme for transmission of uplink control information. The transmission of uplink control information may be transmission of uplink control information multiplexed on a PUSCH, such as with payload data. In some embodiments, the base station may also determine to indicate to a UE to apply a different modulation and coding scheme to uplink control information transmitted by the UE than a modulation and coding scheme applied to payload data transmitted by the UE. In some embodiments, the determination to indicate to a UE to apply a modulation order cap may be based on a code rate, or beta_offset value to be applied in determining a code rate, of the modulation and coding scheme for the uplink control information. For example, if a code rate is low, such as 1/8, the base station may determine to indicate to a UE to apply a modulation order cap, such as a modulation order cap limiting a modulation order to QPSK, in determining the modulation order of the modulation and coding scheme.

The base station may, at step 501, transmit, to the UE a cap enablement parameter indicating to apply the modulation order cap to the modulation and coding scheme for the uplink control information. In some embodiments, the base station may also transmit a parameter specifying a level at which to set the cap. The uplink control information for which the cap enablement parameter is transmitted may include at least one of a HARQ-ACK, a first part of channel state information, and a second part of channel state information. The cap enablement parameter may be transmitted in an RRC communication or in downlink control information, as described with respect to the basis for the UE determination at step 401 of the method of FIG. 4, and described with respect to the operation of base station 105 of FIG. 3. For example, the base station may transmit downlink control information having a specific format indicator, such an indicator that the downlink control information is in format 1_2. In some embodiments, the base station may transmit a priority indicator, such as a high priority indicator, in downlink control information format 1_2 as the cap enablement parameter indicating to apply the modulation order cap. In some embodiments the base station may also transmit an indication to the UE to use a different modulation and coding scheme for the uplink control information from a modulation and coding scheme used for payload data, as described with respect to the basis for the UE determination at step 400 of FIG. 4, and described with respect to the operation of the base station 105 of FIG. 3.

The base station may, at step 502, receive uplink control information to which the first modulation and coding scheme, having an order capped by the modulation order cap, has been applied. For example, the UE may receive the cap enablement parameter transmitted by the base station at step 501 and may determine a modulation and coding scheme for the uplink control information based on the cap enablement parameter. The UE may then transmit the uplink control information on a PUSCH, such as a low priority PUSCH, using the determined modulation and coding scheme, and the uplink control information may be received by the base station. Thus, a base station may transmit indicators of a UE to use in determining whether to apply a modulation order cap in determining a modulation and coding scheme for uplink control information.

A UE may transmit uplink control information using a modulation and coding scheme based on an indication received from a base station. An example method, shown in FIG. 9, of UE operation may begin, at step 900 with receipt of an indication to apply a modulation order cap in determining a first modulation and coding scheme for application to uplink control information different from a modulation and coding scheme applied to payload data. In some embodiments, the indication to apply a modulation order cap may include an indication to apply the first modulation and coding scheme. In some embodiments, the indication to apply the modulation order cap may be received from a base station, such as in a cap enablement parameter as described with respect to step 501 of FIG. 5. At step 902, the UE may transmit uplink control information using a modulation and coding scheme indicated by the received indication to apply the modulation order cap. Such transmission may, for example, be similar to the transmission described with respect to step 404 of FIG. 4. In some embodiments, step 900 may be performed along with one or more steps described with respect to FIG. 4. For example, the received indication described with respect to step 900 may be used as a basis for a determination to apply a first modulation and coding scheme and/or to apply a modulation order cap in determining the first modulation and coding scheme as described with respect to FIG. 4. In some embodiments, the steps described with respect to FIG. 9 may be performed by an apparatus including a processor or a memory, and/or may be included in instructions stored in a non-transitory computer readable medium. In still other embodiments, an apparatus may include means for performing the steps described with respect to FIG. 9.

A UE may, in some embodiments, receive an uplink control information transmission priority indicator indicating that uplink control information is high priority and may apply a modulation and coding scheme to transmitted uplink control information based on the high priority. An example method, shown in FIG. 10, may begin, at step 1000, with receipt, by a UE, of an uplink control information transmission priority indicator indicating a first priority of the uplink control information, where the first priority is greater than a second priority. The first priority may, for example, be a high priority. In some embodiments, the received uplink control information transmission priority indicator may be included in an uplink control information transmission grant. The priority indicator may be a DCI format, as described herein, or may be comprised in a priority indicator information element of a DCI format, as further described herein.

At step 1002, the UE may transmit uplink control information using a modulation and coding scheme based on a modulation order indicated by the first priority of the uplink control information. For example, in some embodiments, the uplink control information may be transmitted on a PUSCH, such as multiplexed on a PUSCH with payload data. In some embodiments, a different modulation and coding scheme may be applied to the uplink control information than is applied to the payload data when the priority of the uplink control information is higher than the priority of the payload data, or the PUSCH in general. In some embodiments, a same modulation and coding scheme may be applied to the uplink control information and the payload data if a priority of the uplink control information is the same as or lower than a priority of the payload data and/or PUSCH. In some embodiments, the second priority may be a priority of the payload data or the PUSCH.

In some embodiments, a modulation and coding scheme for the uplink control information may be selected based on a modulation order cap. For example, when a modulation and coding scheme is used for uplink control information that is different from a modulation and coding scheme used for payload data multiplexed with the uplink control information, a modulation order cap may be used in determining the different modulation and coding scheme for the uplink control information. A modulation order cap may impose an upper limit on a modulation order of the modulation and coding scheme used in transmitting the uplink control information having the first priority. As one example, a modulation order cap of QPSK may be imposed, limiting modulation and coding schemes to be used in transmission of the uplink control information to being less than or equal to QPSK. In some embodiments, the steps described with respect to FIG. 10 may be performed by an apparatus including a processor or a memory, and/or may be included in instructions stored in a non-transitory computer readable medium. In still other embodiments, an apparatus may include means for performing the steps described with respect to FIG. 10.

Figure 6:
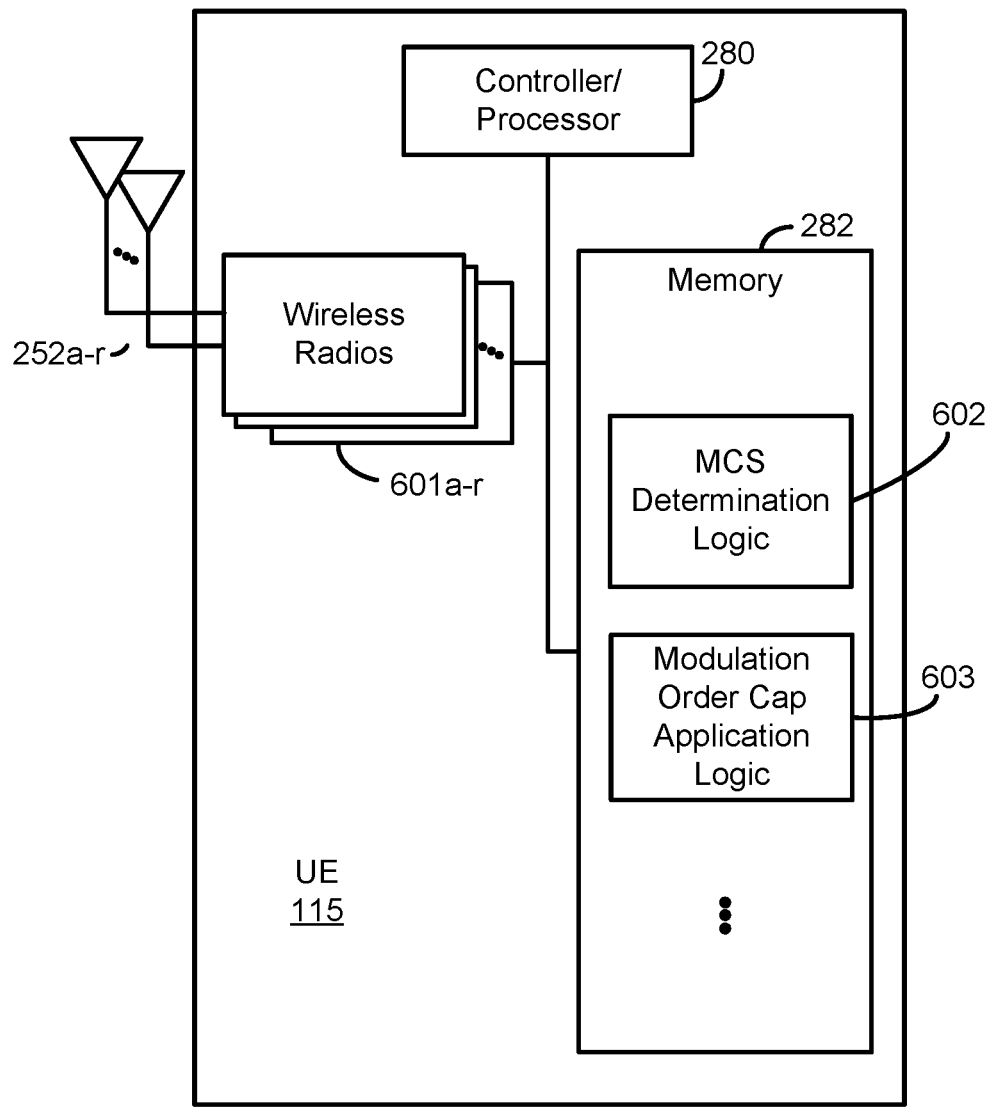
FIG. 6 is a block diagram conceptually illustrating a design of a UE configured to perform a process, for example, as described with respect to FIGS. 4, 9, and 10, according to some embodiments of the present disclosure.
Figure 9:
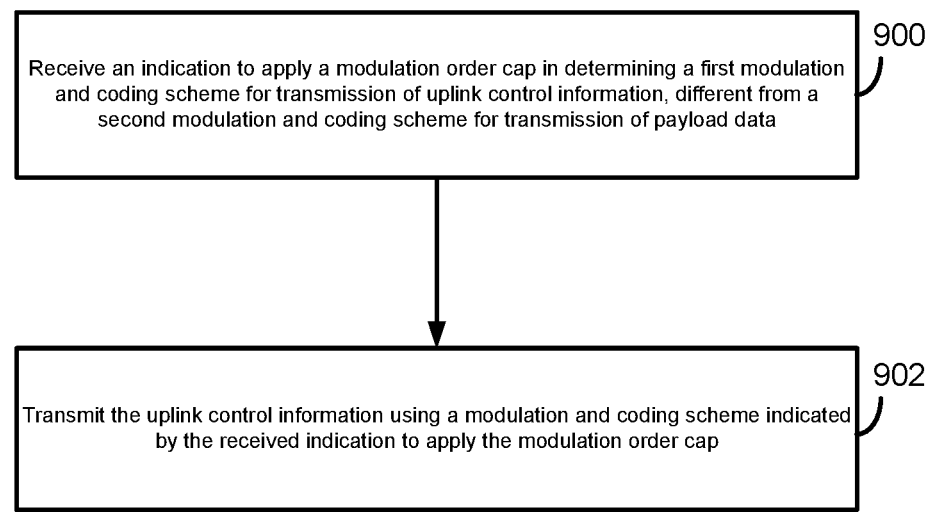
FIG. 9 is a diagram illustrating an example process performed, for example, by a user equipment according to some embodiments of the present disclosure.
Figure 10:
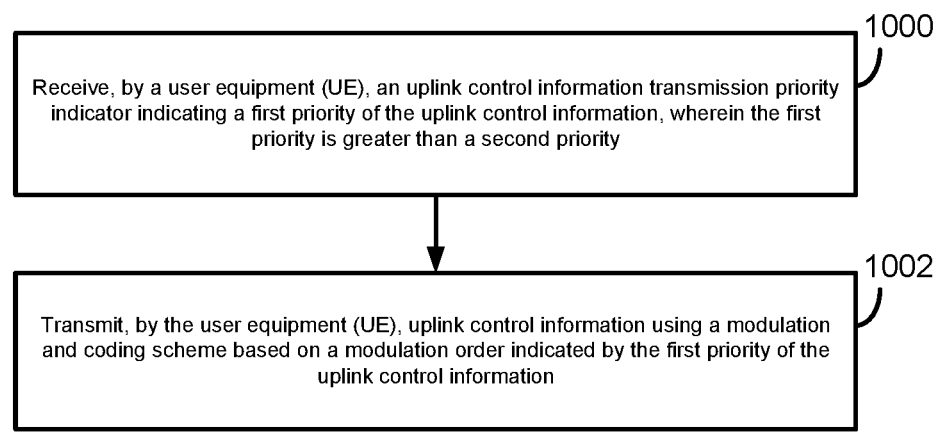
FIG. 10 is a diagram illustrating an example process performed, for example, by a user equipment according to some embodiments of the disclosure.

FIGS. 4, 9, and 10 are block diagrams illustrating example blocks executed to implement some aspects of the present disclosure. The example blocks will also be described with respect to UE 115 as illustrated in FIG. 6. FIG. 6 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601*a-r* and antennas 252*a-r*. Wireless radios 601*a-r* includes various components and hardware, as illustrated in FIG. 2 for UE 115, including modulator/demodulators 254*a-r*, MIMO detector 256, receive processor 258, transmit processor 264, and TX MIMO processor 266. A memory 282 of the UE 115 may include modulation and coding scheme (MCS) determination logic 602. The MCS determination logic 602 may include logic to cause the UE 115 to determine to apply a first modulation and coding scheme for transmission of uplink control information multiplexed on a PUSCH that is different from a second MCS for application to payload data. The memory 282 may further include modulation order cap application logic 603 for determining whether to apply a modulation order cap in determination of the first MCS. The MCS determination logic 602 may also include logic to cause the UE 115 to determine the first MCS for application based on the determination of whether to apply a modulation order cap. In some cases, the MCS determination logic 602 may further include logic for determining an MCS for application to uplink control information on a PUSCH channel further based on a received offset value from a code rate of the second MCS for application to payload data. In some embodiments, the MCS determination logic 602 may further include logic to determine a priority of the PUSCH, and determination of the MCS for application to the uplink control information by the MCS determination logic 602 may be based further on the priority of the PUSCH. In some embodiments, the wireless radios 601a-r of the UE 115 may perform steps including receiving an indication of an offset value from a code rate of a second MCS for a payload data transmission, receiving an uplink transmission grant, receiving an indication to apply a modulation order cap, and transmitting uplink control information using a determined first MCS.

Figure 7:
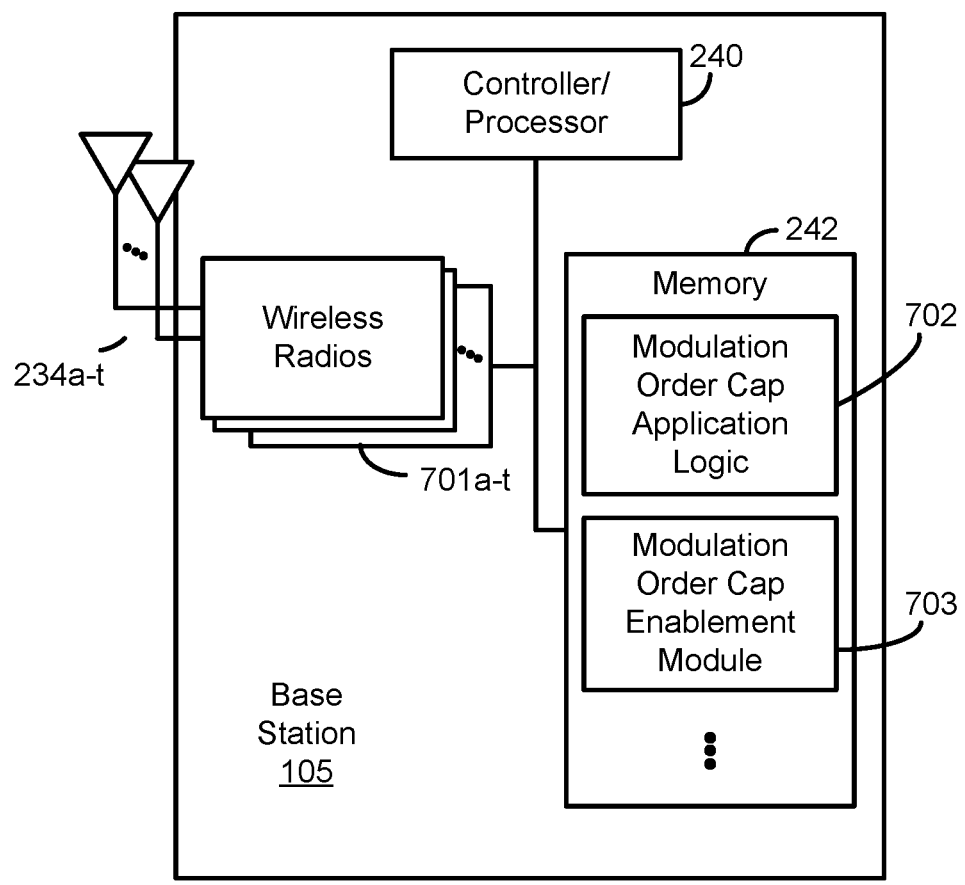
FIG. 7 is a block diagram conceptually illustrating a design of a base station configured to perform a process, for example, as described with respect to FIG. 5, according to some embodiments of the present disclosure.

FIG. 5 is a block diagram illustrating example blocks executed to implement one aspect of the present disclosure. The example blocks will also be described with respect to eNB 105 as illustrated in FIG. 7. FIG. 7 is a block diagram illustrating eNB 105 configured according to one aspect of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 701a-t and antennas 234a-t. Wireless radios 701a-t includes various components and hardware, as illustrated in FIG. 2 for eNB 105, including modulator/demodulators 232a-t, MIMO detector 236, receive processor 238, transmit processor 220, and TX MIMO processor 230. The eNB 105 may include a memory 242. The memory 242 of the eNB 105 may include modulation order cap application logic 702, which may include logic for determining to indicate to a UE to apply a modulation order cap to a modulation and coding scheme for transmission of uplink control information. The wireless radios 701a-t may perform steps including transmitting a cap enablement parameter indicating to apply the modulation order cap, by the UE, to the modulation and coding scheme and receiving uplink control information to which a modulation and coding scheme having its order capped by the modulation order cap has been applied.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2, 6, and 7) may comprise processors, electronics devices, hardware devices, electronics components, logical circuits, memories, software codes, firmware codes, etc., or any combination thereof. In addition, features discussed herein relating to the methods of FIGS. 4-5 and 9-10 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 4-5 described in connection with the disclosure herein may be implemented as electronic hardware, computer software, or combinations of both.) To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a user equipment (UE), the method comprising:
   during a first transmission and based on a first uplink control information of the first transmission being assigned a first priority, transmitting the first uplink control information and first data with a same first modulation and coding scheme and a same first modulation order as each other;
   prior to a second transmission, receiving, a downlink transmission indicating that second uplink control information to be transmitted in the second transmission is assigned a second priority that is higher than the first priority; and
   performing the second transmission based on the indication of the assignment of the second priority by:
      applying to the second uplink control information a predefined maximum modulation order lower than the first modulation order by selecting a second modulation order for the second uplink control information (a) according to a condition that the selected second modulation order not exceed the predefined maximum modulation order and (b) that is lower than the first modulation order; and
      transmitting, in the second transmission:
         the second uplink control information with the selected second modulation order and using a second modulation and coding scheme; and
         second data with the first modulation order and using the first modulation and coding scheme.

2. The method of claim 1, wherein the second modulation and coding scheme is associated with a received indication of an offset value from a code rate of the first modulation and coding scheme.

3. The method of claim 1, wherein a code rate of the second modulation and coding scheme is associated with a received indication of an offset value from a code rate of the first modulation and coding scheme.

4. The method of claim 1, further comprising receiving, by the UE, an indication of an offset value from a code rate of the first modulation and coding scheme for transmission of data, wherein receiving, by the UE, the indication of the offset value comprises at least one of:
   receiving an indication of an offset value from the code rate of the first modulation and coding scheme for determining a code rate of a hybrid automatic repeat request acknowledgement (HARQ-ACK) of the second uplink control information;
   receiving an indication of an offset value from the code rate of the first modulation and coding scheme for determining a code rate of a first channel state information part of the second uplink control information; and
   receiving an indication of an offset value from the code rate of the first modulation and coding scheme for determining a code rate of a second channel state information part of the second uplink control information.

5. The method of claim 1, wherein the second modulation and coding scheme is a modulation and coding scheme for transmission of at least one of: a hybrid automatic repeat request acknowledgement (HARQ-ACK) of the second uplink control information, a first channel state information part of the second uplink control information, and a second channel state information part of the second uplink control information.

6. The method of claim 1, wherein the indication of the assignment of the second priority is a downlink control information (DCI) format.

7. A user equipment (UE) for wireless communication, comprising:
   at least one memory; and
   at least one processor coupled to the at least one memory, the at least one processor configured to:
      during a first transmission and based on a first uplink control information of the first transmission being assigned a first priority, transmit the first uplink control information and first data with a same first modulation and coding scheme and a same first modulation order as each other;
      prior to a second transmission, receive a downlink transmission indicating that second uplink control information to be transmitted in the second transmission is assigned a second priority that is higher than the first priority; and perform the second transmission based on the indication of the assignment of the second priority by:
applying to the second uplink control information a predefined maximum modulation order lower than the first modulation order by selecting a second modulation order for the second uplink control information (a) according to a condition that the selected second modulation order not exceed the predefined maximum modulation order and (b) that is lower than the first modulation order; and
transmitting, in the second transmission:
the second uplink control information with the selected second modulation order and using a second modulation and coding scheme; and
second data with the first modulation order and using the first modulation and coding scheme.

8. The UE of claim 7, wherein the second modulation and coding scheme is associated with a received indication of an offset value from a code rate of the first modulation and coding scheme.

9. The UE of claim 7, wherein a code rate of the second modulation and coding scheme is associated with a received indication of an offset value from a code rate of the first modulation and coding scheme.

10. The UE of claim 7, wherein the processor is further configured to receive an indication of an offset value from a code rate of the first modulation and coding scheme for transmission of data, wherein the configuration to receive the indication of the offset value comprises a configuration to at least one of:
receive an indication of an offset value from the code rate of the first modulation and coding scheme for determining a code rate of a hybrid automatic repeat request acknowledgement (HARQ-ACK) of the second uplink control information;
receive an indication of an offset value from the code rate of the first modulation and coding scheme for determining a code rate of a first channel state information part of the second uplink control information; and
receive an indication of an offset value from the code rate of the first modulation and coding scheme for determining a code rate of a second channel state information part of the second uplink control information.

11. The UE of claim 7, wherein the second modulation and coding scheme is a modulation and coding scheme for transmission of at least one of: a hybrid automatic repeat request acknowledgement (HARQ-ACK) of the second uplink control information, a first channel state information part of the second uplink control information, and a second channel state information part of the second uplink control information.

12. The UE of claim 7, wherein the indication of the assignment of the second priority is a downlink control information (DCI) format.

13. A non-transitory computer-readable medium having program code recorded thereon, the program code comprising:
program code executable by a computer for causing the computer to:
during a first transmission and based on a first uplink control information of the first transmission being assigned a first priority, transmit the first uplink control information and first data with a same first modulation and coding scheme and a same first modulation order as each other;
prior to a second transmission, receive a downlink transmission indicating that second uplink control information to be transmitted in the second transmission is assigned a second priority that is higher than the first priority; and
perform the second transmission based on the indication of the assignment of the second priority by:
applying to the second uplink control information the predefined maximum modulation order lower than the first modulation order by selecting a second modulation order for the second uplink control information (a) according to a condition that the selected second modulation order not exceed the predefined maximum modulation order and (b) that is lower than the first modulation order; and
transmitting, in the second transmission:
the second uplink control information with the selected second modulation order and using a second modulation and coding scheme; and
second data with the first modulation order and using the first modulation and coding scheme.

14. The computer-readable medium of claim 13, wherein a code rate of the second modulation and coding scheme is associated with a received indication of an offset value from a code rate of the first modulation and coding scheme.

15. The computer-readable medium of claim 13, wherein the program code further comprises program code executable by a computer for causing the computer to receive an indication of an offset value from a code rate of the first modulation and coding scheme for transmission of data, wherein the program code executable for causing a computer to receive the indication of the offset value comprises program code executable for causing a computer to at least one of:
receive an indication of an offset value from the code rate of the first modulation and coding scheme for determining a code rate of a hybrid automatic repeat request acknowledgement (HARQ-ACK) of the second uplink control information;
receive an indication of an offset value from the code rate of the first modulation and coding scheme for determining a code rate of a first channel state information part of the second uplink control information; or
receive an indication of an offset value from the code rate of the first modulation and coding scheme for determining a code rate of a second channel state information part of the second uplink control information.

16. The computer-readable medium of claim 13, wherein the second modulation and coding scheme is a modulation and coding scheme for transmission of at least one of: a hybrid automatic repeat request acknowledgement (HARQ-ACK) of the second uplink control information, a first channel state information part of the second uplink control information, and a second channel state information part of the second uplink control information.

17. The computer-readable medium of claim 13, wherein the indication of the assignment of the second priority is a downlink control information (DCI) format.

18. An apparatus for wireless communication, comprising:
first means for, during a first transmission and based on a first uplink control information of the first transmission being assigned a first priority, transmitting the first uplink control information and first data with a same first modulation and coding scheme and a same first modulation order as each other; and
second means for, prior to a second transmission, receiving a downlink transmission indicating that second uplink control information to be transmitted in the second transmission is assigned a second priority that is higher than the first priority; and wherein the first means is configured for performing the second transmission based on the indication of the assignment of the second priority by:

applying to the second uplink control information the predefined maximum modulation order lower than the first modulation order by selecting a second modulation order for the second uplink control information (a) according to a condition that the selected second modulation order not exceed the predefined maximum modulation order and (b) that is lower than the first modulation order; and transmitting, in the second transmission:

the second uplink control information with the selected second modulation order and using a second modulation and coding scheme; and second data with the first modulation order and using the first modulation and coding scheme.

19. The apparatus of claim 18, wherein a code rate of the second modulation and coding scheme is associated with a received indication of an offset value from a code rate of the first modulation and coding scheme.

20. The apparatus of claim 18, further comprising means for receiving, by the UE, an indication of an offset value from a code rate of the first modulation and coding scheme for transmission of data, wherein the means for receiving, by the UE, the indication of the offset value comprises at least one of:

means for receiving an indication of an offset value from the code rate of the first modulation and coding scheme for determining a code rate of a hybrid automatic repeat request acknowledgement (HARQ-ACK) of the second uplink control information;

means for receiving an indication of an offset value from the code rate of the first modulation and coding scheme for determining a code rate of a first channel state information part of the second uplink control information; and means for receiving an indication of an offset value from the code rate of the first modulation and coding scheme for determining a code rate of a second channel state information part of the second uplink control information.

21. The apparatus of claim 18, wherein the second modulation and coding scheme is a modulation and coding scheme for transmission of at least one of: a hybrid automatic repeat request acknowledgement (HARQ-ACK) of the second uplink control information, a first channel state information part of the second uplink control information, and a second channel state information part of the second uplink control information.

22. The apparatus of claim 18, wherein the indication of the assignment of the second priority is a downlink control information (DCI) format.

* * * * *